United States Patent [19]

Smith et al.

[11] Patent Number: 5,134,263

[45] Date of Patent: Jul. 28, 1992

[54] INFRARED HEATING CONTROL

[75] Inventors: Donald P. Smith, 2051 Valley View, Dallas, Tex. 75234; J. E. High; William W. Plumb, both of Dallas, Tex.

[73] Assignee: Donald P. Smith, Dallas, Tex.

[21] Appl. No.: 253,305

[22] Filed: Sep. 29, 1988

Related U.S. Application Data

[63] Continuation of Ser. No. 6,731, Jan. 22, 1987, abandoned, which is a continuation of Ser. No. 855,843, Apr. 24, 1986, abandoned, which is a continuation of Ser. No. 523,645, Aug. 15, 1983, abandoned.

[51] Int. Cl.$^5$ .............................................. H05B 6/68
[52] U.S. Cl. .................. 219/10.55 M; 219/10.55 A; 219/10.55 B; 99/325; 426/243
[58] Field of Search ................. 219/10.55 A, 10.55 B, 219/10.55 E, 10.55 R, 10.55 F, 10.55 M, 388, 400; 99/325, 326, 342, 477, 451, DIG. 14; 426/243, 241, 234, 523

[56] References Cited

U.S. PATENT DOCUMENTS

| 3,409,447 | 11/1968 | Jeppson | 219/10.55 A |
|---|---|---|---|
| 3,718,082 | 2/1973 | Lipoma | 99/477 |
| 3,906,115 | 9/1975 | Jeppson | 426/243 |
| 3,916,136 | 10/1975 | Anderson et al. | 219/10.55 A |
| 4,154,861 | 5/1979 | Smith | 219/10.55 E |
| 4,162,381 | 7/1979 | Buck | 219/10.55 B |
| 4,191,876 | 3/1980 | Ohkubo et al. | 219/10.55 B |
| 4,246,462 | 1/1981 | Meisel | 219/10.55 R |
| 4,366,357 | 12/1982 | Satoh | 219/10.55 B |
| 4,367,388 | 1/1983 | Ishihara et al. | 219/10.55 B |
| 4,379,964 | 4/1983 | Kanazawa et al. | 219/10.55 B |

Primary Examiner—Philip H. Leung
Attorney, Agent, or Firm—Crutsinger & Booth

[57] ABSTRACT

A process and apparatus for heating food products under a temperature and humidity controlled atmosphere, the apparatus employing intermittent microwave heating in combination with infrared sensors adapted to initiate and terminate heating in response to measured changes in the temperature of the food product as a result to heat conduction to the center of the product while the microwave heating unit is turned off.

18 Claims, 6 Drawing Sheets

INFRARED HEATING CONTROL

This application is a continuation of application Ser. No. 07/006,731, filed Jan. 22, 1987 (now abandoned); which was a continuation of Ser. No. 06/855,843, filed Apr. 24, 1986 (now abandoned); which was a continuation of Ser. No. 06/523,645, filed Aug. 15, 1983 (now abandoned).

BACKGROUND OF INVENTION

This application relates to improvements in ovens of the type disclosed in copending application Ser. No. 06/177,174, filed Aug. 11, 1980, which is a continuation of application Ser. No. 038,129 filed May 11, 1979 both abandoned. The disclosure of each of these applications is incorporated herein by reference in its entirety for all purposes. These applications are assigned to the same assignee as the present application.

Although temperature control is critical to the successful cooking of food products, difficulty is encountered in heating the product uniformly to the optimum temperature because the heat required to obtain the desired heating varies with a number of factors including the volume and shape of the product, the initial temperature of the product, the porosity of the product, the moisture content of the product, and the composition of the product. For example, in a conventional oven, the cooking time and temperature for a five-pound roast which is shaped like a cube may be significantly different than the cooking time and temperature required to cook a two-pound roast cut to form a slice ½-inch thick. Similar difficulties are encountered in microwave ovens and forced convection ovens.

A variety of time and temperature control devices have been employed heretofore in ovens for cooking food products. Thermostatically controlled burners or electric heating elements are commonly used in combination with a timing device for cooking a product at a predetermined temperature for a predetermined time period. Probes have been used for measuring the internal temperature of a product so that heating of the product can be terminated either manually or automatically when the internal temperature of the food adjacent the probe reaches a predetermined temperature.

Microwave and surface heating devices have been employed in tunnel ovens such as those made by Cry-o Dry Corporation using a combination of circulating hot air and microwave to dry potato chips. Another tunnel application has been built by Litton Industries Inc. for Consolidated Foods Co. in Berryville, Ark., using a combination of steam and microwave to moisten and cook chicken. Tunnel ovens using microwave heating to heat rubber preforms are made by Gerling-Moore Co., San Francisco, Calif., and tunnel ovens to thaw meat are made by Ratheon Co., Waltham, Massachusetts. Microwave tunnel ovens with surface cooling and with surface steam heating are made by Les Micro Ordes, Paris, France.

Microwave tunnel type ovens have been employed for heating meals in hospitals. One such oven has been built by AFS Systems of Sweden, in which each portion of the food product is carried in a container and the container is in turn carried through the tunnel by an endless conveyor system. A plurality of microwave generators are disposed sequentially along the tunnel. A lever is used to turn each microwave generator on or off. As each container passes, it trips the lever to heat the food and, as the container moves past the lever, the lever swings back to its normal position to turn the generator off. The amount of radiation emitted depends on the time the lever is held in the "on" position. When transporting a series of containers through the tunnel the lever, held in the "on" position, will cause continuous emission of microwaves, which means the different food products along the conveyor are continuously heated by microwaves emitted from all of the generators. Accordingly, the heat supplied to each individual food product or portion is not controlled as much as desirable when different sized containers or different spacing of containers on the conveyor are encountered. This problem is especially acute when the successive increments of food products require different heating, such as when one meal has an entree and two vegetables and the next is salt free (which heats differently in microwave) and the next is a vegetarian meal.

Temperature control devices of the type heretofore employed are disclosed in a number of U.S. Patents including: U.S. Pat. No. 3,177,335; U.S. Pat. No. 3,431,399; U.S. Pat. No. 3,611,336; U.S. Pat. No. 3,884,213; U.S. Pat. No. 3,931,620; U.S. Pat. No. 3,974,696; U.S. Pat. No. 3,975,720; U.S. Pat. No. 4,086,813; U.S. Pat. No. 4,149,056; and U.S. Pat. No. 4,217,477.

The invention disclosed herein relates to improvements in apparatus for controlling ovens and particularly microwave ovens while eliminating the need to position probes and other devices in or on the food product.

SUMMARY OF INVENTION

The process and apparatus for controlling heat delivered to a food product is disclosed in combination with a conveyorized oven which utilizes a combination of microwave deep heating and apparatus for forming jets of moist heated air for heating the surface of the food product as the food product progresses intermittently through successive cavities. An infrared thermometer or other radiant energy temperature sensor is positioned to sense the surface temperature of the food product. Since evaporative cooling can cool the surface of a food product very quickly and since infrared sensors respond only to surface radiation from the product, the temperature and humidity of the atmosphere immediately adjacent the food product are controlled. The temperature of the atmosphere adjacent the food product is preferably substantially equal to the desired temperature of the product and the humidity is controlled to assure that the atmosphere adjacent the product is saturated with moisture. Thus, if the moist food product is heated to the desired temperature, an equilibrium condition is established between the surface of the food product and the atmosphere adjacent to the product.

While in this controlled atmosphere, the temperature of the product is determined and the transfer of heat to the product is terminated when the temperature of the surface of the product reaches a predetermined limit. At the expiration of a predetermined period of time the surface temperature of the product is again determined and compared with the temperature at the beginning of the time period. If the temperature of the surface of the product decreases during the time period, this indicates that heat is being transferred from the surface of the product to the interior and further heating is required to obtain a uniform temperature throughout the product.

The infrared sensor is preferably employed in combination with a programmable microcomputer for initiating and terminating microwave and surface heating in each chamber.

The apparatus hereinafter described and illustrated in the attached drawings includes infrared sensors positioned to deliver a signal representative of the surface temperature of the food product to a microcomputer to turn off a microwave generator when the surface temperature of the product reaches a predetermined level. After expiration of a specified time period the infrared sensor generates a second signal which is representative of the temperature of the moist food product at the expiration of the time period. If the food product has cooled during the time period, this indicates that the center of the product has not been heated sufficiently and the microwave generator is again energized. During the time period which elapses between the first and second temperature reading, the atmosphere adjacent the food product is maintained at a specified temperature level and the atmosphere is maintained saturated to prevent evaporation of moisture from the surface of the food product which would introduce error into the temperature reading.

The moist food product is carried on a conveyor through successive heating chambers where either surface heating or microwave or both is employed for heating the food product. An infrared sensor is employed to indicate the temperature of the surface of the food product in successive chambers so that microwave heating is added until the product reaches a preselected temperature. Once the food product reaches the preselected temperature, microwave generators are not activated as the product moves through successive chambers unless the surface temperature of the product drops below the preselected temperature. Further, surface heating may be controlled independently of the microwave heating so that microwave heating will be terminated after the surface of the product reaches a predetermined temperature, for example 190° Fahrenheit, while surface heating continues in successive chambers to provide browning or drying of the surface of the product if it is deemed expedient to do so.

It is a primary object of the invention to provide a control for a cooking oven wherein heat supplied to the product is controlled by a sensor which detects infrared radiation from the surface of the product to control the heating of the product regardless of the size, shape or thermal conductivity of the moist food product.

It is a further object of the invention to provide a microwave tunnel type oven for rapidly heating the interior of food products of different size, shape and thermal conductivity while precisely controlling the heat transferred to each individual food product as it is moved through successive compartments in the oven.

A further object of the invention is to provide a process for controlling the ambient atmosphere adjacent a food product in an oven to permit the use of an infrared sensing device to determine the temperature of the surface of the food product while eliminating cooling of the surface of the product which would introduce erroneous readings in the sensing of the infrared radiation.

A still further object of the invention is to provide control apparatus for a conveyorized oven wherein a moist food product is moved successively through a plurality of chambers wherein heat generating devices in each chamber are individually energized and deactivated in response to the surface of the product in the individual chamber reaching a predetermined temperature.

Other and further objects of the invention will become apparent upon referring to the detailed description hereinafter following and to the drawings annexed hereto.

DESCRIPTION OF DRAWING

Drawings of a preferred embodiment of the invention are annexed hereto so that the invention may be better and more fully understood, in which.

Numeral references are employed to designate like parts throughout the various figures of the drawing.

DESCRIPTION OF A PREFERRED EMBODIMENT

Figure 1:
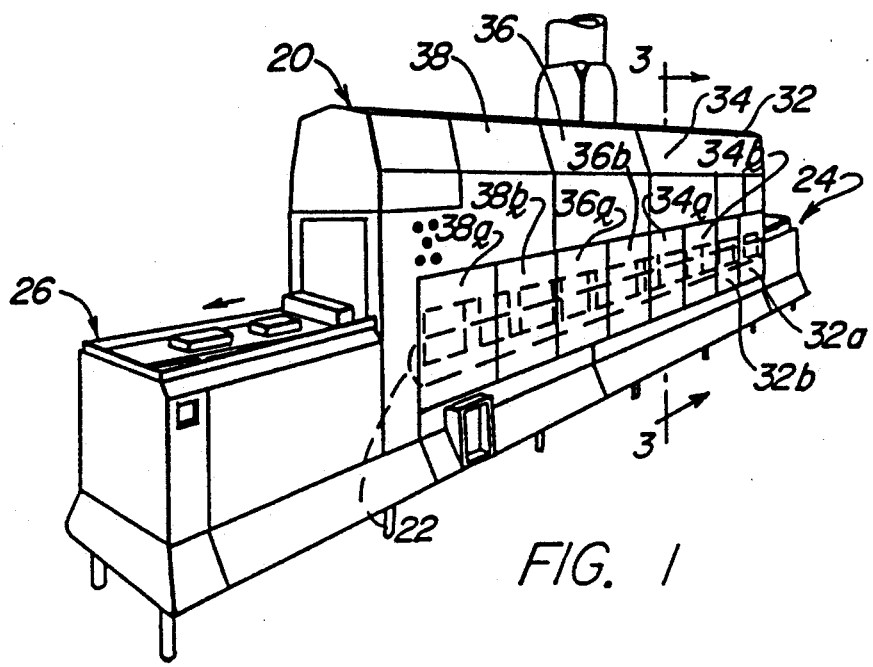
FIG. 1 is a diagrammatic perspective view of a conveyorized tunnel oven employing microwave and surface heating apparatus for heating a product as it is successively moved through a plurality of compartments.
Figure 4A:
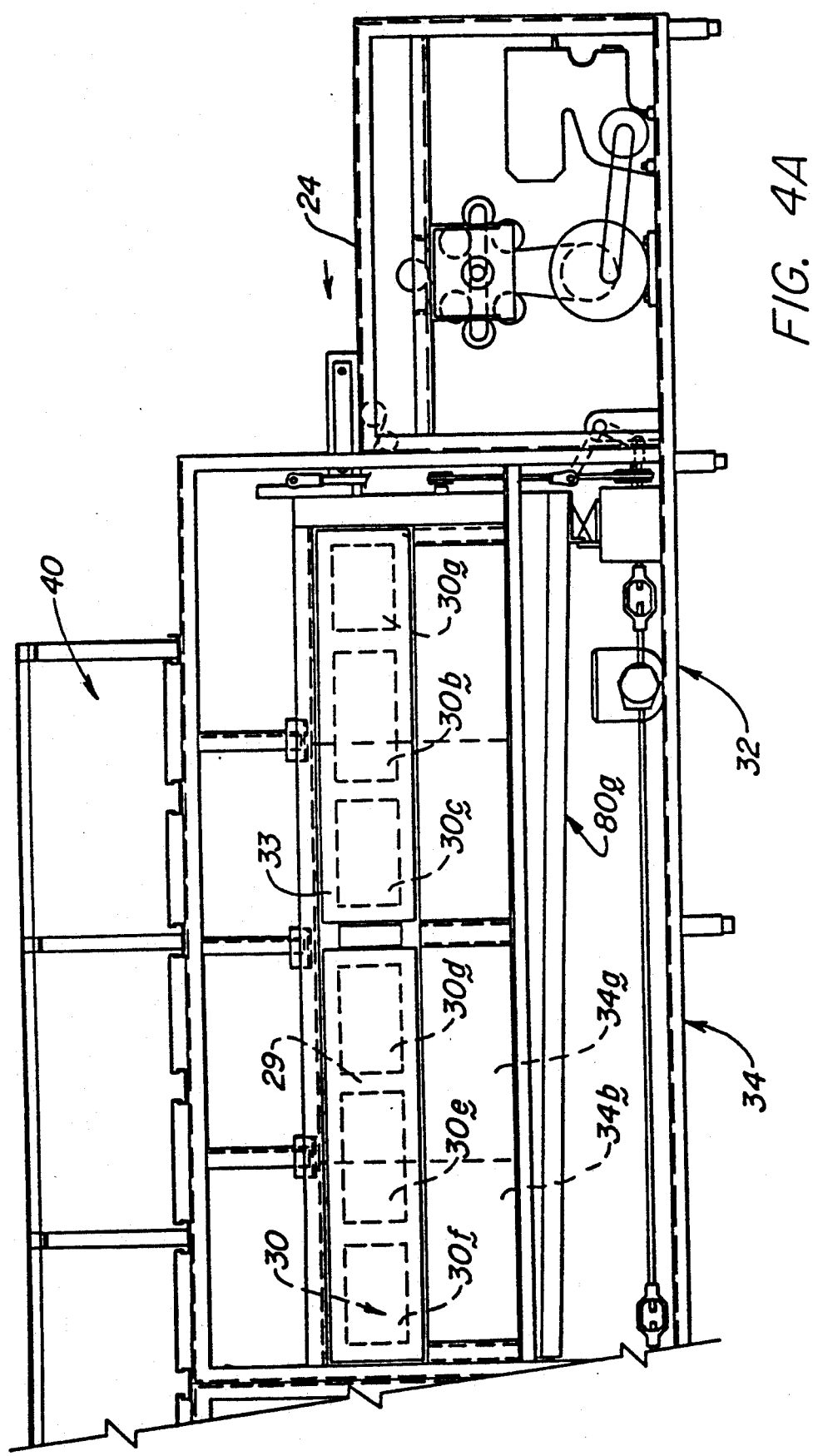
FIGS. 4a and 4b is an elevational view of the oven, parts being broken away to more clearly illustrate details of construction.
Figure 4B:
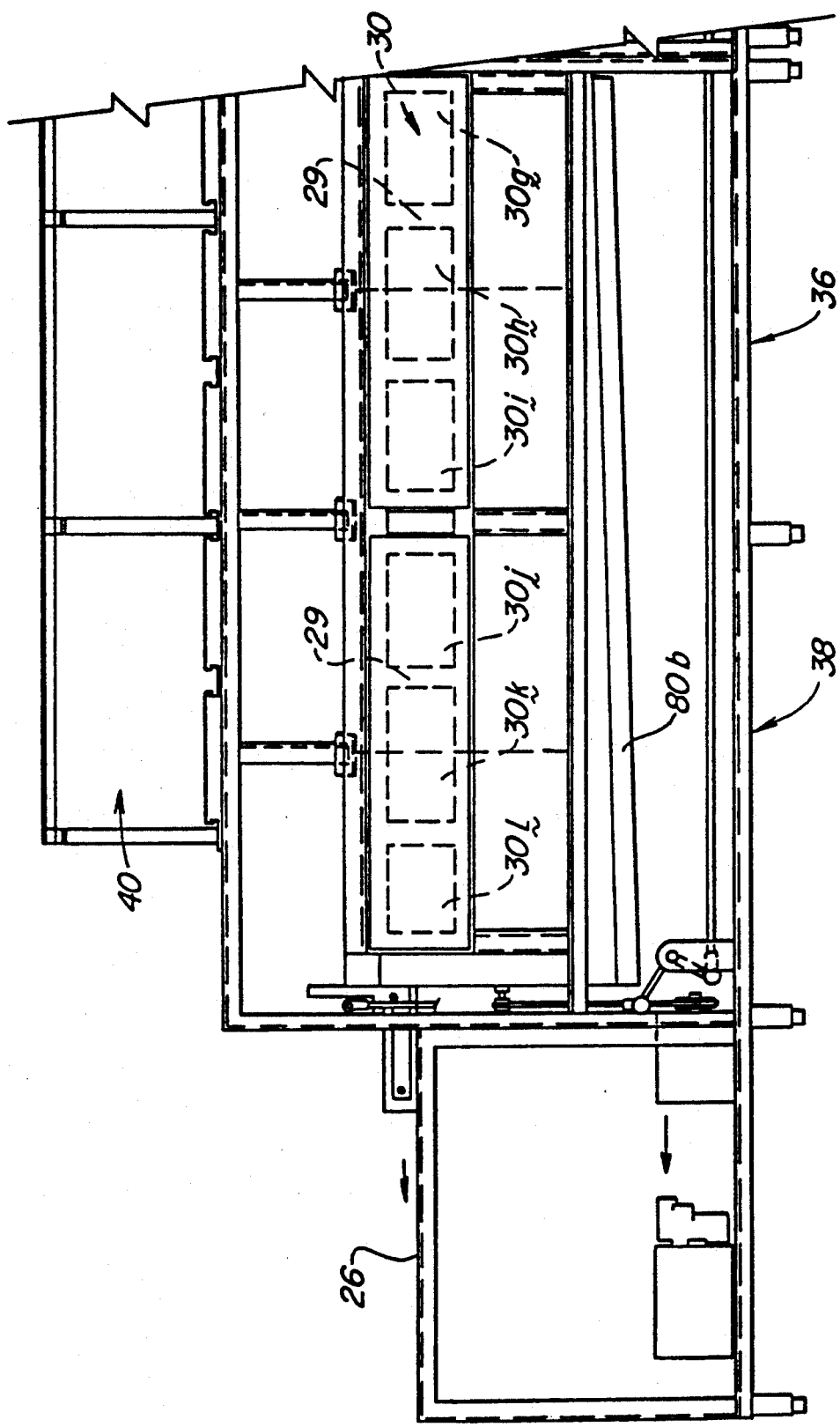

Referring to FIG. 1 of the drawing, the numeral 20 generally designates a conveyorized tunnel oven having a conveyor 22 extending from an entrance end 24 to the exit end 26. As will be hereinafter more fully explained, the interior of the oven is provided with an elongated heating chamber 28 divided by partitions 29 to form a plurality of heating cavities 30a–30l, as best illustrated in FIGS. 4a and 4b.

In the particular embodiment of the invention illustrated in FIGS. 1 and 4 of the drawing, the oven is of modular construction and comprises entrance section 32, two intermediate sections 34 and 36 and a delivery or exit section 38.

Entrance section 32 has a vertically swinging door 33 pivotally secured to a side wall of the oven for sealing cavities 30a, 30b and 30c. Vertically swinging doors 35, 37 and 39 are similarly mounted to close cavities 30d, 30d and 30f of intermediate section 34; cavities 30g, 30h and 30i of intermediate section 36; and cavities 30j, 30k and 30l of delivery section 38.

Horizontally swinging doors 32a and 32b are hingedly secured to opposite ends of the entrance section 32 and cover the vertically swinging door 33. Horizontally swinging doors 34a cover vertically swinging door 35; horizontally swinging doors 36a and 36b cover vertically swinging door 37 and horizontally swinging doors 38a and 38b cover vertically Swinging door 39.

Figure 5:
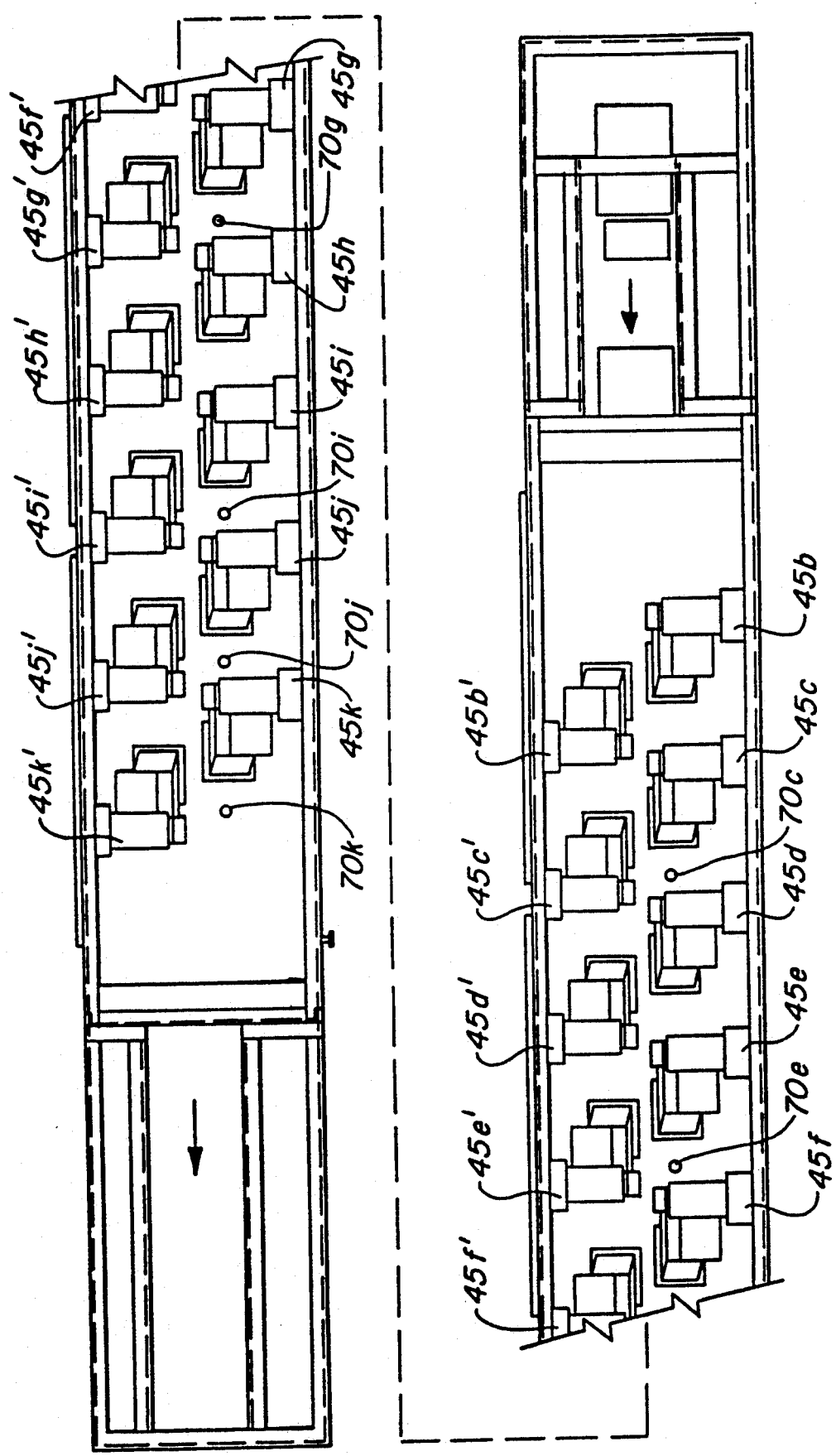
FIG. 5 is a top plan view of the oven, parts being broken away to more clearly illustrate details of construction.
Figure 6:
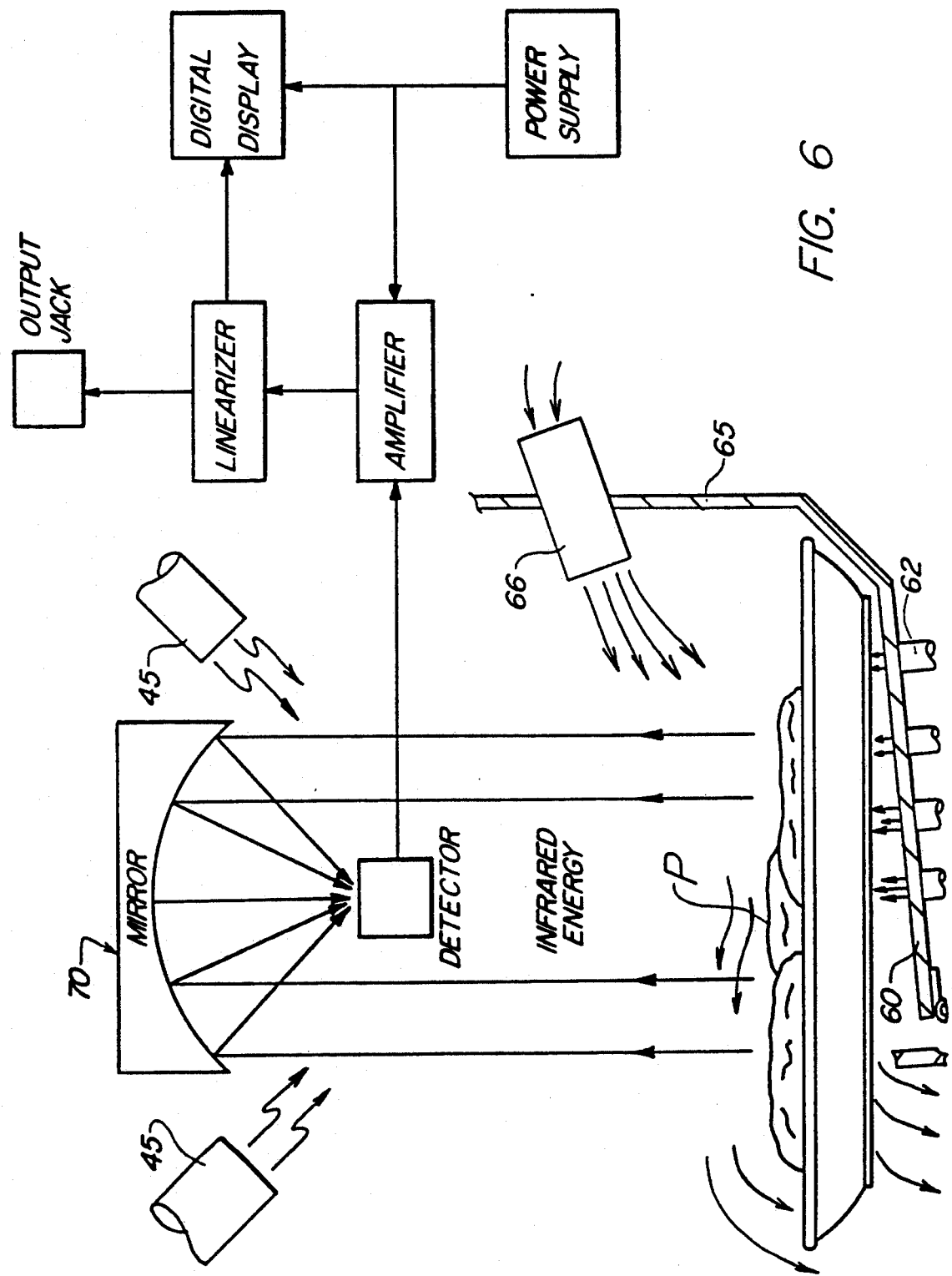
FIG. 6 is a diagrammatic view illustrating the control system.

As best illustrated in FIGS. 3, 4a, 4b and 5 a magnetron chamber 40 extends along the entire upper portion of the oven and is provided with forced circulation of filtered air to provide cooling for the electrical circuitry of magnetrons housed therein. The magnetrons for radiating microwave energy for heating the product are spaced as illustrated in FIG. 5 such that two magnetrons deliver microwave energy into each of the cavities 30b-30k. As will be hereinafter more fully explained, microwave energy is not delivered into entrance cavity 30a or into delivery cavity 30l.

A pair of magnetrons 45b and 45b' deliver microwave energy into cavity 30b while magnetrons 45c and 45c' deliver microwave energy into cavity 30c.

Figure 2:
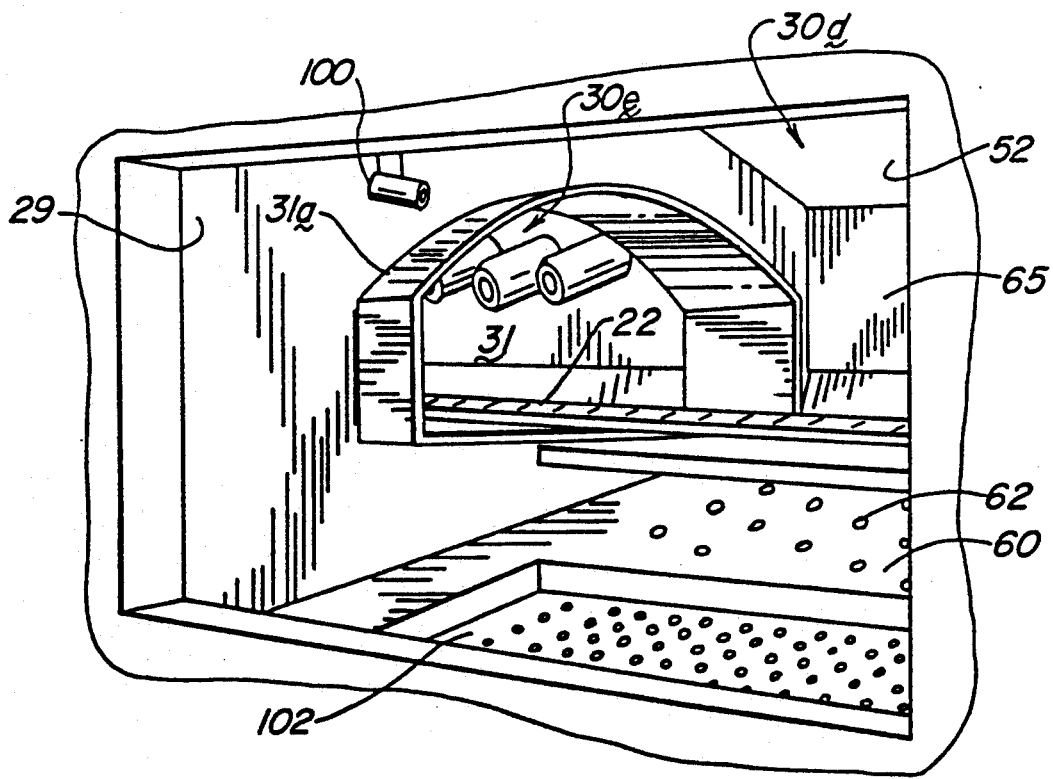
FIG. 2 is a fragmentary perspective view of the interior of a cooking chamber and a partition between adjacent chambers.
Figure 3:
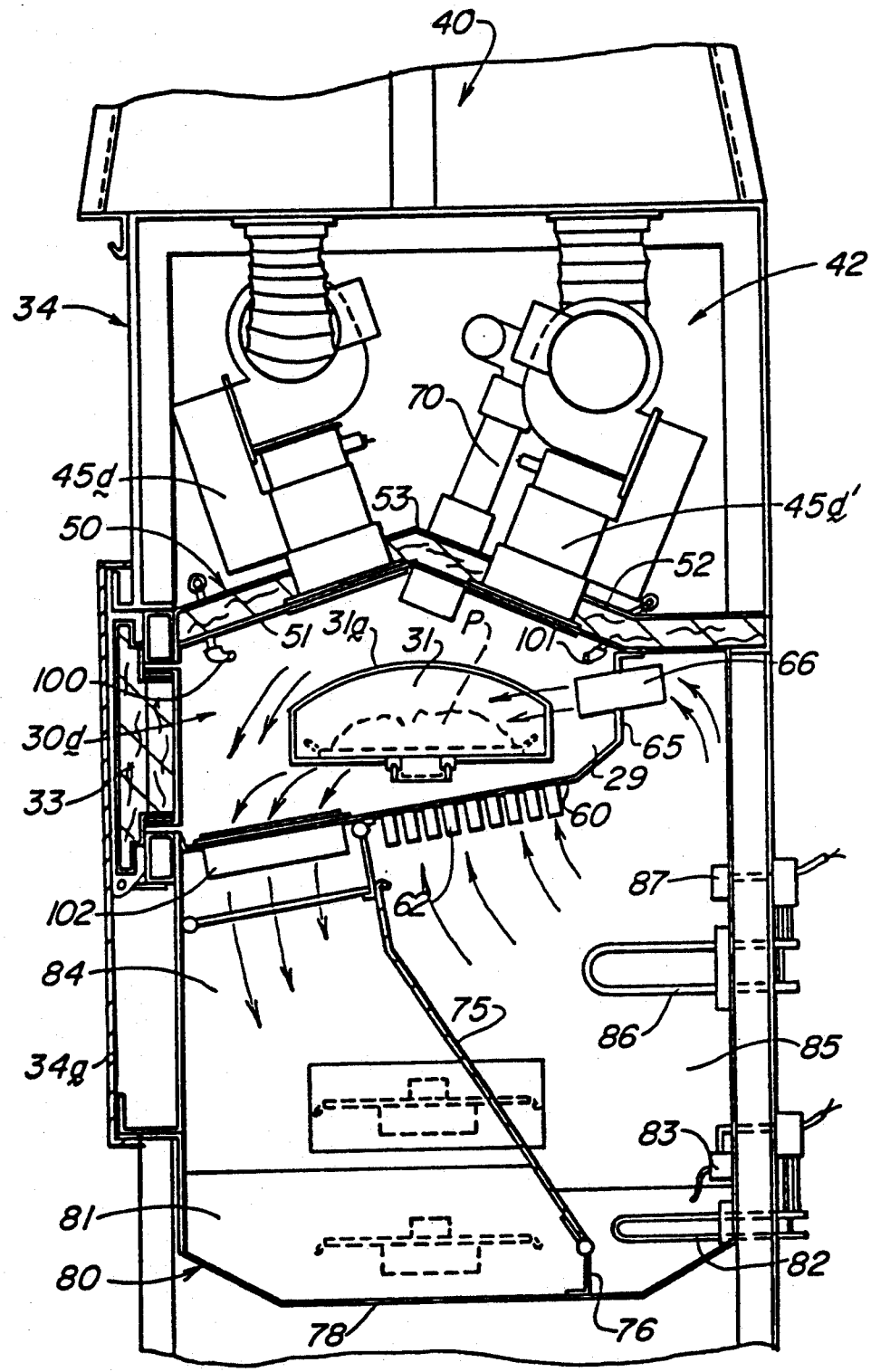
FIG. 3 is a cross-sectional view taken along line 3—3 of FIG. 1.

As best illustrated in FIGS. 2 and 3 each cavity is separated from the adjacent cavity by a partition wall 29 having a passage 31 formed therein through which containers carrying the product to be heated are carried by the conveyor 22. A choke 31a extends around the periphery of opening 31 to minimize the escape of microwave energy from one cavity to the adjacent cavity. The width of opening 31 is approximately equal to the width of the conveyor 22 and the upper portion of opening 31 is curved to permit movement of food products therethrough while minimizing the area of the opening.

The cavity 30d is formed between segments 51 and 52 of a hip roof or top wall 50 having a ridge 53 extending longitudinally of the oven and defining the upper boundary of the heating chamber 28. The floor 60 of the heating chamber is perforated and tubes 62 having a length of at least about two times the diameter of the tube are positioned in communication with perforations in the floor 60 to form columnated jets of air which impinge against the lower surface of the container carrying the product through the oven, as will be hereinafter more fully explained. The back wall 65 of the conveyor has a plurality of tubes 66 extending therethrough for directing a flow of air over the surface of the product P.

The roof 50 and bottom wall 60 are secured to the front wall of the oven having openings formed therein closed by vertically swinging doors 33, 35, 37 and 39.

As will be hereinafter more fully explained, an infrared sensor 70 which is adapted to collect infrared energy emitted by the product and provides a "readout" of the temperature of the product. Infrared sensors of this type are commercially available from Mikron Instrument Company, Inc. of Ridgewood, N.J. or from Wahl Instruments, Inc. of Culver City, Calif. Such devices are described in detail in Wahl Catalog No. W101D, Revision A and in Mikron M65 Infrared Temperature Measurement and Control Systems Catalog 65 Rev. 0, each of the catalogs being incorporated herein by reference in its entirety.

As best illustrated in FIG. 5, infrared sensors 70c, 70e, 70g, 70i, 70j, and 70k sense the temperature of the product in cavities 30c, 30e, 30g, 30i, 30j, and 30k, respectively. The first heating cavity 30a is not provided with either magnetrons or infrared sensing devices. Magnetrons 45b and 45b' radiate microwave energy to heat a product in cavity 30b. However, an infrared sensor is not provided in cavity 30b, in the particular embodiment of the invention illustrated, since most products delivered through the oven will require at least some microwave heating. Infrared sensor 70c is provided in the third cavity 30c for sensing the temperature of the product and turning off the magnetrons 40c and 40c' when the surface temperature of the product reaches a predetermined level. Infrared sensor 70c also controls magnetrons 45d and 45d' in heating cavity 30d. Thus, in the illustrated embodiment, if the surface temperature of the product is not sufficiently high by the time the product leaves chamber 30c, the product will be heated in chamber 30d and sensor 70e will terminate heating of the product in chamber 30e if the surface temperature of the product has reached the predetermined level. The exit cavity 30l is not provided with microwave heating or an infrared sensor. However, cavities 30i, 30j, and 30k are each provided with infrared sensors to provide precision control of the final temperature of the product as it is moved through the heating chamber 28 by conveyor 22.

According to a preferred embodiment of the invention, the operation of magnetrons 45 and infrared sensors 70 is controlled through use of a microcomputer that is programmed with one or more thermal treatment cycles for use with various food products or combinations of food products. If desired, conveyor 22 can also be computer controlled so as to coordinate its operation with that of magnetrons 45 and sensors 70, thereby improving the overall efficiency of oven 20.

The particular conveyorized tunnel oven hereinbefore described is intended for heating or cooking 300 meals per hour and to provide a maximum of two minutes of heating time for each meal. The heating chamber is divided into ten cavities which are provided with microwave energy radiating magnetrons and the conveyor 22 is driven on a timed cycle to maintain the product in each cavity for a period of twelve seconds.

As best illustrated in FIGS. 3, 4a and 4b a partition 75 extends downwardly from the floor 60 of the heating chamber and the lower end is supported by spaced support members 76 above the bottom 78 of water troughs 80a and 80b to permit flow of water laterally across trays 80a and 80b below partition 75.

A heating element 82 is provided for heating water in tray 80 and a thermostat control 83 is provided for controlling the heating element 82 for maintaining water in tray 80 at a precisely controlled temperature. Partition 75 divides the space below floor 60 and above the surface of water 81 in tray 80 into an air return duct 84 and a plenum 85. A heating element 86 is positioned in plenum 85 and is adapted to heat air flowing thereacross, heating element 86 being controlled by a thermostat 87 to maintain the air temperature in the plenum at a predetermined level.

A pair of water spray nozzles 100 and 101 are positioned adjacent opposite corners of each of the cavities 30 for spraying water through the cavity for the purpose of cleaning. The bottom wall 60 is inclined downwardly toward air return duct 84 and the floor 60 has openings formed in the perforated bottom of a tray 102 to permit flow of water sprayed from spray nozzles 100 and 101 to return through the return duct 84 to trays 80a and 80b. Since the level of water in the tray is above the lower edge of partition 75 grease and other matter floating on the surface of the water will not flow downwardly into the plenum 85. By maintaining the temperature of the water in tray 80 and the temperature of the air in the plenum at controlled levels the wet bulb temperature of air in plenum 85 and flowing into the cavities of the heating chamber is precisely controlled.

From the foregoing it should be readily apparent that by maintaining the temperature and relative humidity of the ambient atmosphere in the cavities of heating chamber at a predetermined wet bulb temperature to assure that the ambient atmosphere is substantially saturated, evaporation of moisture from the surface of the food product during the heating cycle will be minimized. It has been observed that evaporation of moisture from the surface of the product results in cooling of the surface of the product and results in an erroneous readout of the temperature of the surface of the product by infrared sensors 70. However, by preventing evaporation from the surface of the food product, the surface temperature of the product can be accurately determined by infrared sensors 70 and the temperature accurately controlled.

When a cold product moves into cavity 30a the tray and the product are immediately contacted by the warm moist air which results in condensation of liquid onto the surface of the product. Heat is immediately transferred to the surface of the product as a result of the latent heat of condensation and the moisture condensed onto the surface of the product prevents drying of the product as it is moved through the heating chamber.

The product will receive microwave energy in chamber 30b and the tray will be heated from the bottom by columnated jets of air flowing through tubes 62 which impinge against the lower surface of the tray. Air currents flowing through tubes 66 sweep across the upper surface of the product and the air flow is directed across the lens on the sight tube of infrared sensor 70 to prevent the formation of condensate on the lens surface which would result in an erroneous temperature reading.

As the product moves through the heating chamber from one cavity to another the delivery of microwave energy to the product will be terminated when the surface of the product reaches a predetermined temperature. As the product moves from one cavity to the other, each infrared sensor will sense the temperature of the product. If the product has not been uniformly heated throughout, heat will be conducted from the surface of the product to the center portion of the product which will result in cooling of the surface of the product and result in magnetrons in the subsequent cavities being energized when the cooling of the surface of the product is indicated by infrared sensors 70.

While the heating chamber 28 hereinbefore described has been divided into ten separate cavities for sequential heating of various products as required in each individual cavity, it should be appreciated that the entire process may be accomplished in a single cavity.

Having described our invention we claim:

1. A process for changing the temperature of a food product to a desired temperature, comprising the steps of: moving the food product through a series of cavities in a chamber; maintaining the temperature and relative humidity of air in the chamber to establish a predetermined wet bulb temperature in a controlled ambient atmosphere around the product in the chamber; measuring infrared radiation from the surface of the food product while the product is in the controlled ambient atmosphere in a first cavity to determine the temperature of the surface of the product; initiating transfer of heat between the food product and a source of heat through the controlled ambient atmosphere in a second cavity until the surface of the product reaches a predetermined temperature; terminating the transfer of heat between the product and the source of heat when the surface of the product reaches the predetermined temperature; holding the product in the controlled ambient atmosphere for a predetermined time period; measuring the temperature of the surface of the product at the expiration of the time period; and resuming transfer of heat between the product and the heat source in a third cavity in response to a specified change in the temperature of the surface of the food product during the time period.

2. The process of claim 1, the step of measuring infrared radiation from the surface of the product while the product is in the controlled ambient atmosphere comprising the steps of: positioning an infrared energy sensor to receive infrared energy emitted from the surface of the product; positioning an infrared transparent barrier between the infrared sensor and the product such that the infrared sensor is isolated from the ambient atmosphere adjacent the product; and circulating air in the controlled ambient atmosphere across the surface of the infrared transparent barrier to prevent condensation of moisture from the ambient atmosphere on the infrared transparent barrier.

3. The process of claim 1, the step of measuring infrared radiation from the surface of the product while the product is in the controlled atmosphere comprising the steps of: forming a target area in the controlled atmosphere; positioning the product in the target area; focusing spaced wave guides on the target area; delivering microwave radiation through the wave guides to heat a product in the target area; and terminating radiation of microwave energy in response to a signal generated by the infrared sensor.

4. The process of claim 1, the step of maintaining the temperature and relative humidity of air in the chamber to establish a predetermined wet bulb temperature in a controlled ambient atmosphere around the product in the chamber comprising the steps of: maintaining the temperature of the controlled ambient atmosphere at the predetermined temperature, and maintaining the relative humidity in the controlled ambient atmosphere so that the atmosphere is in equilibrium with product at the predetermined temperature to prevent evaporation of moisture from the surface of the product when the surface of the product is at the predetermined temperature.

5. The process of claim 4, with the addition of the steps of: delivering microwave energy to the product in each of said series of cavities until the product is heated throughout its volume so that the change in temperature of the surface of the product is less than five degrees Fahrenheit when held in the controlled ambient atmosphere for the time period.

6. The process of claim 1, the step of transferring heat comprising the step of: delivering microwave energy to the product.

7. The process of claim 1 where the step of maintaining the temperature and relative humidity of air in the chamber to establish a predetermined wet bulb temperature in a controlled ambient atmosphere around the product in the chamber comprises the steps of: forming a package around the product such that atmosphere in the package will become saturated with moisture evaporated from the product when the product is heated; and venting the atmosphere inside the package so that the pressure of the atmosphere in the package is substantially equal to the pressure outside the package.

8. Apparatus to heat a food product comprising: a heating chamber; a floor in said heating chamber, said floor having perforations formed therein; tubes communicating with said perforations to project spaced discreet streams of air into said chamber; a return duct extending longitudinally of the chamber, said floor having exhaust passages formed therein communicating with the inside of the chamber and the return duct; a plenum extending longitudinally of said chamber, said plenum and said return duct having a partition therebetween, said partition having an opening in a lower portion thereof; water in lower portions of the plenum and the return duct, said opening being positioned to permit flow of water between the plenum and the return duct; means to deliver air from said plenum into the chamber; means to exhaust air from said chamber; means controlling the temperature and humidity of the atmosphere adjacent the surface of the product in the chamber; infrared energy sensing means; heating means to transfer heat to a product in the chamber; and control means associated with the sensing means and with the heating means to terminate transfer of heat to the product when the temperature of the surface of the product is above a predetermined temperature.

9. The apparatus of claim 8 with the addition of: a pair of spray nozzles in said chamber; and pump means to deliver water from said plenum through said spray nozzles into the chamber, water in the chamber draining through the exhaust openings into the return duct, said opening in the partition being positioned below the surface of the water in the return duct such that material floating on the surface of the water in the return duct will not flow through the opening into the plenum.

10. The apparatus of claim 8 with the addition of: a fan to draw air from the return duct and discharge air into said plenum.

11. The apparatus of claim 10 with the addition with the addition of: means to heat the water.

12. The apparatus of claim 11 with the addition of: means to heat air circulated by said fan.

13. The apparatus of claim 12 with the addition of: a first thermostat to control the temperature of the heated air; and a second thermostat to control the temperature of the water, said first and second thermostats controlling the wet bulb temperature of the atmosphere in the chamber.

14. Apparatus to controllably heat each of a plurality of food products wherein the heating required to obtain the desired heating varies with volume, shape, initial temperature, porosity, moisture content and composition of the products, the improvement comprising: a heating chamber, partitions in the heating chamber to form a plurality of heating cavities; a conveyor extending through said heating chamber to sequentially move products through said heating cavities; means controlling the temperature and humidity of the atmosphere adjacent the surface of products in each cavity to control the wet bulb temperature of the atmosphere in the cavity to control evaporation of moisture on the surface of the product in the cavity; infrared energy sensing means in a first of said cavities; heating means to transfer heat to a product in a second of said cavities; and control means associated with said infrared energy sensing means in said first cavity associated with said heating means in said second cavity to control heat transfer to the product in the second cavity based on the sensed condition of the product in the first cavity.

15. Apparatus according to claim 14, said means controlling the wet bulb temperature comprising: a source of temperature controlled liquid in said chamber; and means circulating temperature controlled air through said chamber and adjacent said source of temperature controlled liquid.

16. Apparatus according to claim 14 with the addition of: a second infrared energy sensing means in said second heating cavity; second heating means in a third of said heating cavities; and control means associated with said second infrared sensing means and with the heating means in said third cavity to control heating of a food product in the third cavity as a result of the sensed condition of the food product in the second cavity.

17. Apparatus according to claim 16, said first and second infrared energy sensors in said first and second cavities being adapted to determine the temperature of a food product in the first and second cavities to control heating of said product in said second and third cavities.

18. Apparatus according to claim 17, said first cavity being positioned such that moisture condenses onto the surface of a cool product carried into said cavity by said conveyor.

* * * * *